Sept. 17, 1946.  R. W. HART  2,407,663
METHOD AND MEANS FOR DISTANCE AND DIRECTION FINDING
Filed Jan. 24, 1939
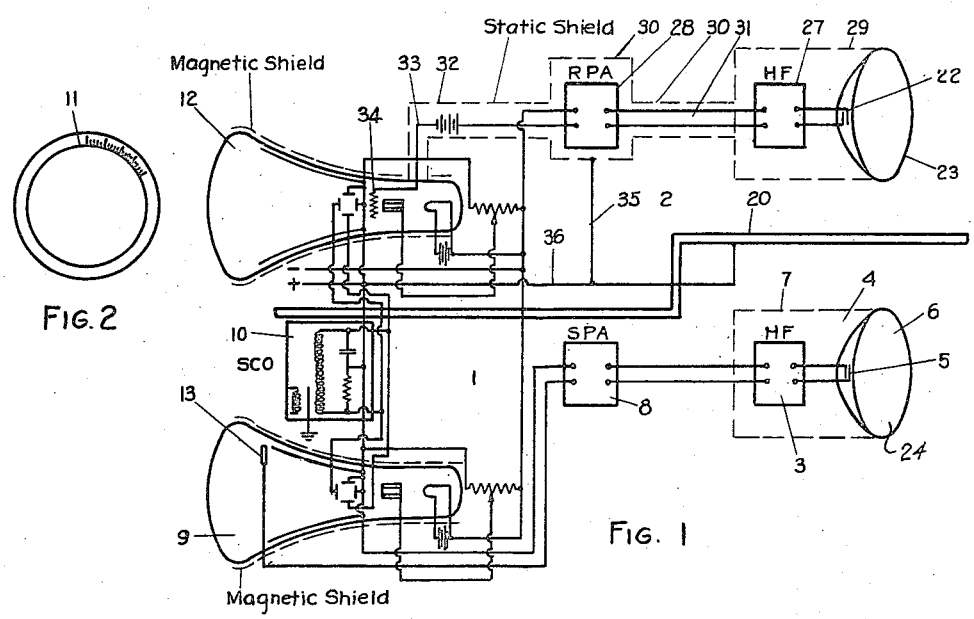
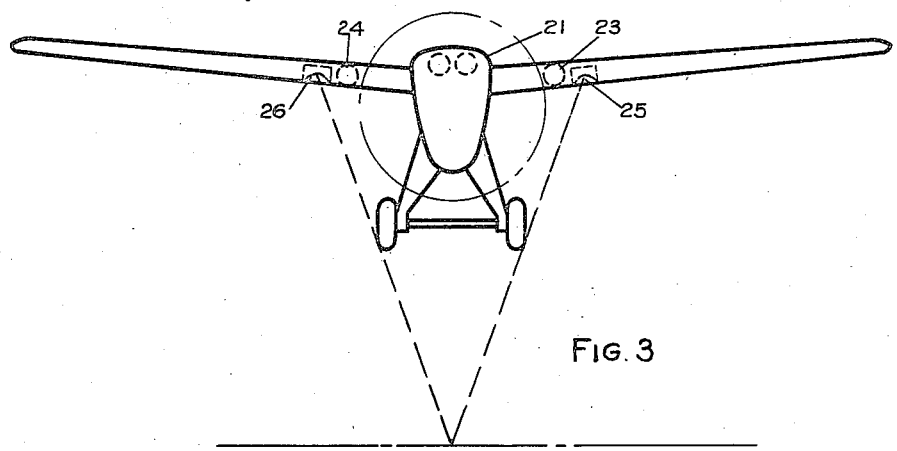
FIG. 3
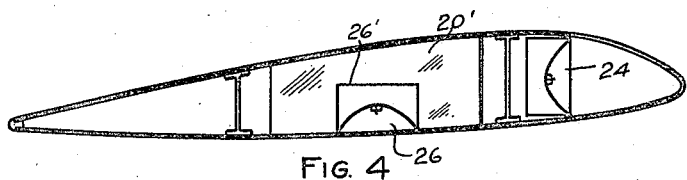
FIG. 4
INVENTOR.
Robert W. Hart
BY
ATTORNEY.

UNITED STATES PATENT OFFICE 2,407,663

METHOD AND MEANS FOR DISTANCE AND DIRECTION FINDING

Robert Winfield Hart, Lynn, Mass., assignor, by mesne assignments, to Submarine Signal Company, Boston, Mass., a corporation of Delaware Application January 24, 1939, Serial No. 252,598

6 Claims. (Cl. 250—1)

The present invention relates to distance measurement by the use of electromagnetic waves and is associated with the same subject matter and a continuation in part of my application Serial No. 9459, filed March 5, 1935, and still pending in the United States Patent Office at the time of the filing of the present application.

The present invention, like its companion application, is particularly applicable to the measurement of heights from an aircraft and also to the measurement of distances of an aircraft from some fixed or moving point of observation either on the ground or on an aircraft itself.

The invention may also be applied to the measurement of distances at sea between vessels or from a vessel to a distant object or obstacle such as a ship, an iceberg or shore points.

In connection with distance finding the present device may also be used for direction determination and therefore for accurately locating the position of the object being observed. In all respects the present invention is intended for the same uses to which the companion application is directed as set forth in that application.

In my application Serial No. 9459 the electromagnetic impulse was controlled by a cathode ray tube having a rotating beam and a keying electrode positioned in the path of the rotating beam. As the beam passed over the keying electrode a short impulse was emitted from the sending radiator and this, after reflection from the object, was received and made to act upon the same cathode ray tube to produce an indication either by a serration of the cathode ray beam or by a suppression of the beam which in either case produced a visible indicated effect upon the fluorescent screen at the face of the cathode ray tube.

The present invention departs from this specific method in that the sending and receiving system are maintained separate at all times and in addition they are screened from each other so that the operation of transmission will not affect the operation of reception. In combination with this effect the applicant uses a short wave length for the electromagnetic waves and a signal which may be relatively long as the result of which the whole system will operate more efficiently and more positively for long ranges as well as for the very short ranges that may be desired.

It will be noted that where it is desired to make the electromagnetic signal in this type of work so short that the signal will be over by the time the impulse is received, a signal of very short time duration is necessary for the shorter distances. Even for a distance as great as one-half mile under such conditions the signal would have to be completely over in about five millionths of a second, which even in electrical circuits is a very short time interval and this in addition would be the minimum distance which would be measured under such conditions.

Not only is it desired to measure shorter distances than this, but it is also desirable for the purposes of obtaining more positive results to use a greater amount of electrical energy which would, in addition to giving longer ranges, give also a stronger echo or reflected signal which at the high frequencies at which the present apparatus works is greatly desired.

These advantages together with others are obtained from the arrangement according to the present invention as will more fully appear from the description given below taken in connection with the drawing in which Fig. 1 shows diagrammatically the arrangement of the sending and receiving system; Fig. 2 shows an end view of the cathode ray indicating tube of Fig. 1; Fig. 3 shows an arrangement of the device or aircraft as viewed from the front of the plane; and Fig. 4 shows a section through the wing of the plane indicating the position of some of the elements.

In the arrangement shown in Fig. 1 the lower half 1 of the figure shows the transmitting system while the upper half 2 of the figure shows the receiving system. In the lower half 1 there is shown a high frequency oscillator 3 with a directive transmitter 4 associated with it comprising an antenna 5 and a reflector 6 which may be shaped in the form of a parabola or other conic section to produce a directive beam forming the transmitter 24. The high frequency oscillator and the directive transmitter are contained in a well shielded case indicated by the dotted line 7. The frequency of the transmitter should preferably be extremely high and it is preferred to use wave lengths even less than one meter so that a highly directive beam may be obtained with apparatus not too large in size. Another reason for using frequencies of this magnitude is that it is desired that the signal be built up rapidly so that a sharp indication of the building up of the signal may be provided when considered from the point of absolute time interval and not from the point of number of oscillations. By the use of a high frequency even with a lower decrement a more rapid absolute building up of the signal may be obtained.

The high frequency circuit of Fig. 1 is operated through a so-called sending pulse amplifier indicated at 8 which amplifies the keying pulse received from the cathode ray tube 9. In this respect the cathode ray tube 9 and the sending pulse amplifier correspond to the same units as described in my companion application referred to above. However, it is intended to operate the cathode ray tube 9 of the present invention in a manner different from that described in my previous application. In the present application the sweep circuit oscillator 10 is of a frequency comparatively low with respect to the frequency of the sweep circuit in the companion application. The frequency of the sweep circuit in the present case is determined by the instrument range in accordance with the scale 11 and the operation of the cathode ray tube 12 at the face of which the scale 11 is positioned. If it is assumed that the minimum reading on the scale 11 should be 50 meters and that this should be denoted by a $\frac{1}{32}$ of an inch calibration in the 5 inch diameter scale, then it will follow that the total scale range is approximately 25,000 meters and the corresponding time period for one revolution of the beam on the cathode ray tube 12 for this range would equal the time necessary for the wave to travel to the most distant object of the range and return which would be 50,000 meters which equals $17 \times 10^{-5}$ seconds or corresponds to a frequency of rotation of the beam of 5900 cycles per second. The sweep circuit oscillator 10 also controls the rotation of the beam in the receiving cathode ray tube 12 as well as in the keying cathode ray tube 9 so that at all times the two beams in the two tubes are in synchronism.

The keying electrode 13 in the tube 9 is positioned to allow a sending impulse to be emitted at a point corresponding to the zero calibration in the tube 12 and this signal continues as long as the cathode ray beam is crossing or passing over the keying electrode 13. The keying electrode 13 may be any desired length and preferably should be sufficiently wide so that the sending impulse will not be cut off so quickly as to cause any transient phenomena effect in the signal itself. The signal in the present case should be properly built up before it is cut off so that the keying electrode should therefore be made wide enough to allow this to occur. If in Figure 1 the circle of rotation of the cathode ray beam in the tube 9 has the same diameter as the indicator scale in the tube 12, the keying electrode may be approximately $\frac{1}{8}$ of an inch wide or even wider. For a width of $\frac{1}{32}$ of an inch for the keying electrode the signal interval will be not less than $1.7 \times 10^{-6}$ seconds and if a wave length of $\frac{1}{2}$ meter is used or 600 megacycles, a signal note of 1002 oscillations will be obtained. For longer signals, of course, a wider electrode may be used.

As the beam passes over the keying electrode 13 in the tube 9 the control grid in the sending pulse amplifier is allowed to operate this circuit in any of the usual ways that this may be done as commonly known in the art. This, in turn, may operate the high frequency oscillator to emit a beam from the antenna position in the reflector. The whole sending system is screened from the receiving system by the screen 20 which may be part of the machine, as, for instance, the fuselage 21, Fig. 3, or separate screening means may be used. As indicated in Figs. 3 and 4, the vertical reflectors may be mounted flush in the underneath side of the wing surface with the open end of the reflector flush with the lower wing surface. A metallic cover 26' may cover the reflector and the high frequency oscillator circuit and this cover may correspond to the shield 20 of Fig. 1 which is placed at the positive ground of the system. The reflector 25 may be constructed and mounted in the same manner as the reflector 26 but on the other side of the fuselage. The metallic fuselage may also be placed at the same potential as 20 by connecting it to the positive side of the system. In addition to that as has been explained above, the high frequency circuit is also screened in the receiving system.

The receiving system comprises a receiving antenna 22 positioned in a receiving reflector 23 which may be similar in shape to that of the reflector 6 or of any other type to receive and concentrate the electromagnetic wave that is returned and also to produce a directional effect so that the direction in which the reflector is pointing will be the direction from which the beam is coming.

By placing the reflector units near the fuselage so that the fuselage cuts off direct radiation from one unit to the other and connecting the fuselage to the mid point of the system, it is possible to shield one reflector from the other, one being used as a transmitter and one as a receiver. In this way the fuselage 21 only may be the shield between the transmitter and receiver when these are directive.

In the present system both sending and receiving reflectors should be directed similarly, and, as indicated in Figs. 3 and 4, two reflectors 23 and 24 may be directed horizontally and two other reflectors 25 and 26 may be directed downwardly so that both horizontal directions and heights may be known.

In the receiving system as set forth in Fig. 1 the impulse picked up by the antenna 22 is amplified by the high frequency circuit 27 and passed on to the receiving pulse amplifier 28. Here again the high frequency system is entirely shielded by the shield 29 surrounding both the high frequency receiver 27 and the antenna system including the reflector. This high frequency shield may also extend around the pulse amplifier by means of the shield 30 which covers not only the leads 31 but also the receiving case 28 and preferably should also be extended by means of the shield 32 to surround the conductor 33 connected to the control electrode 34 in the cathode ray tube 12. The shielding about the receiving system and that between the two systems may be connected together by means of the conductor 35 which must be so proportioned that both ends will be at a voltage node and the whole shield may be brought to the potential of the plus side of the cathode ray tube power supply system by connecting to the conductor 36.

As has been stated above, the reflectors used are to be directive so that a beam of energy may be produced. With short waves and with liberal shielding by bonded metal plates, the sending and receiving systems may be well shielded from each other. In this respect it is well known that short electromagnetic waves will be reflected from metallic surfaces having surface dimensions large in comparison with the wave length of the transmitted wave. By placing the sender and receiver on opposite sides of large plates 20', Fig. 4, or on opposite sides of the fuselage, as indicated in Fig. 3, so that one is in the shadow of the beam embracing the other, and further by local shielding, that is by a metallic body surrounding the unit 26', Fig. 4, the sending and receiving units may be shielded from each other.

The control electrode 34 may be used in such a manner that the cathode ray beam will be released by the signal, in which case the electrode 34 must normally, in a non-operating position, suppress the beam, or, the electrode may be used to suppress the beam when the signal is returned. The bias voltage on the electrode for this purpose may be varied as desired in the tube and the tube may be so adjusted for properly accomplishing these results. Other means of operating the indicating system may also be used and the indication may be produced by a serration in the beam or by other suitable means as explained more in detail in the companion application Serial No. 9,459. The rotation of the beams in both tubes 9 and 12 is controlled by the sweep circuit oscillator 10, and as the keying electrode 13 may be considerably wider than the calibrations on the scale in the tube 12, it will follow that the received signal may cover a considerable number of calibrated spaces on the receiving scale. In such a case, however, a particular point of reading may be decided upon, preferably the beginning of the received indication and, in fact, if a circuit is used in the receiving system which is self blocking, it will be possible to produce only a short indicated signal on the receiving scale.

Since in the present arrangement the transmitted signal will be screened from direct effect upon the receiver, no direct signal will be heard and therefore even though the transmitted signal may continue for a time after the electron beam has passed over the electrode 13, as may sometimes be the case due to the continued oscillation of the system, particularly if parts of the system are tuned, no detrimental effect will be produced upon the receiving system.

Having now described my invention, I claim:

1. A system for measuring distance by the use of electromagnetic waves in which the distance is measured by the time interval elapsing between the instant of transmission of the wave and its receipt after reflection from the object whose distance is to be measured comprising sending and receiving systems electrically shielded from one another, said systems each including a cathode ray tube and means operatively connecting the same to transmitter and receiver elements respectively, a sweep circuit operatively connected to said tubes for synchronizing the rotation of the cathode ray beam in both tubes, means positioned in the sending tube and operatively associated with the cathode ray beam thereof for controlling the instant of emission of a wave impulse by said sending system and means positioned in the receiving cathode ray tube and operatively associated with the cathode ray beam thereof for indicating the instant of receipt of a wave impulse by said receiving system.

2. A system for measuring distance by the use of electromagnetic waves in which the distance is measured by the time interval elapsing between the instant of transmission of the wave and its receipt after reflection from the object whose distance is to be measured comprising sending and receiving systems electrically shielded from one another, said systems each including a cathode ray tube and means operatively connecting the same to transmitter and receiver elements respectively, a sweep circuit operatively connected to said tubes for synchronizing the rotation of the cathode ray beam in both tubes, means positioned in the sending tube and operatively associated with the cathode ray beam thereof for controlling the instant of emission of a wave impulse by said sending system and means positioned in the receiving cathode ray tube and operatively associated with the cathode ray beam thereof for indicating the instant of receipt of a wave impulse by said receiving system and means in the sending system for making the time length of the transmitted signal longer than the time of travel of the wave impulse over twice the shortest distance to be measured on the receiving cathode ray tube.

3. In a system for measuring distance by the use of electromagnetic waves, a plurality of cathode ray tubes, means causing the cathode ray beam in each of said tubes periodically to traverse a predetermined path, means synchronizing the beams in said tubes, a transmitting system and a receiving system, one of said tubes having an additional electrode positioned in the path of the cathode ray beam and means operatively connecting said electrode to said transmission system, the other of said cathode ray tubes having an electrode adapted to produce a variation in the beam of said tube and means operatively connecting said electrode with said receiving system, said receiving and transmitting system having means shielding one from the other and having respectively directive transmitting and receiving elements adapted to radiate and receive wave lengths of approximately one-half meter.

4. A system for measuring distance by the use of electromagnetic waves comprising means for producing a high frequency beam of electromagnetic waves of approximately one-half meter, means for receiving a beam after reflections from the object whose distance is to be measured, said means being shielded from said transmitting means and means for controlling the instant of emission of said transmitted waves and indicating the instant of reception of the received wave including a plurality of cathode ray tubes having means producing a rotating beam therein, means synchronizing the beams in said tubes, means positioned in one of said cathode ray tubes for controlling the emission of the transmitted signal and means positioned in another cathode ray tube for producing a visible indication.

5. A system for measuring distance from an airplane having a metallic fuselage to the ground or other object by the use of electromagnetic waves in which the distance is measured by the direct measurement of the interval elapsing from the instant of transmission of a wave impulse and its receipt after reflection from the ground or object whose distance is to be measured including means for producing a directive beam for transmission of the wave impulse located at one side of the fuselage and means for directively receiving a reflected wave impulse, said means being located on the opposite side of the fuselage, means connecting the fuselage geometrically shielding the sender from the receiver at such a point in the system whereby the radiation from the transmitting antenna is screened from the receiving antenna, means for indicating the time interval directly between the receipt of the wave impulses received by the receiving antenna and the moment of emission of the wave impulse from the sending antenna, said wave impulse having a time length longer than the shortest time interval adapted to be indicated by the indicating device.

6. In a system for measuring from an aircraft distances to the ground or other objects by means of electromagnetic waves wherein the distance is measured by means of measuring directly the time interval elapsing between the instant of emission of a wave signal and its receipt after reflection from the object whose distance is to be measured comprising a sending system and a receiving system having metallic shielding means having an extensive metallic surface located between the sending and receiving systems for electromagnetically shielding said systems from each other, means for synchronizing the instant of sending the emitted signal with the beginning of the time measuring interval and means including in part said last-named means for emitting a signal having a time length comparatively long with respect to the shorter distances to be measured.

ROBERT WINFIELD HART.